Patented May 17, 1938

2,117,315

UNITED STATES PATENT OFFICE 2,117,315

TREATING SOYA BEANS

Fritz Gössel, Frankfort-on-the-Main, Germany, assignor to General Soya Corporation, New York, N. Y., a corporation of New York No Drawing. Application October 11, 1935,
Serial No. 44,632

6 Claims. (Cl. 99—98)

This invention relates to a new method of treating soya beans to refine the beans and remove volatile constituents of an undesirable character, and convert other constituents of undesirable flavor into constituents of no flavor or of a pleasing flavor, without objectionable injury to the valuable constituents of the beans.

In my prior Patent No. 1,912,895, I have described the treatment of unmilled soya beans by heating them for a few minutes in a liquid which prevents oxidation of the constituents of the beans. The present process is an improvement upon the process of said patent.

According to the present invention, the unmilled beans are subjected to a regulated heating, for example, by contact with hot gases or heated surfaces and gases heated thereby, and the beans are protected, during such heating, by coating them with a thin layer of a mineral oil or other oil that is not objectionable or adversely affected by the treatment.

The present process also advantageously includes, as a preliminary step of the process, a washing of the soya beans and an increase in the moisture content of the beans as a result of such preliminary washing treatment, particularly in the case of soya beans that are naturally dry and where an increased moisture content is desirable during the subsequent heat treatment of the beans to aid in bringing about the changes which are desirable during such heat treatment.

The covering or coating of the beans with the film of oil has various advantages, among them the increase in the heat conductivity of the beans during the heat treatment, the protection of the beans against oxidation, the safeguarding of the beans against destruction of biological values, and the prevention or minimizing or slowing up of the evaporation of water contained in the beans. The presence of the oil covering thus protects the beans by preventing the oxygen contained in the hot air or hot gases, such as products of combustion or other heated gases in the heating chamber used for heating the beans, from gaining access to the beans and oxidizing their constituents, while certain volatile constituents of the beans, to which the objectionable bitter taste and odor seem to be largely due, are readily volatilized and removed, or their undesirable odor and taste eliminated by changing the composition under the heat treatment.

One of the changes which it seems desirable to accomplish during the heat treatment is a conversion of glucosides into sugar or perhaps into some other substances by the action of the water present in the beans. A natural water content of around 10 to 15% is desirable for completing this conversion, and, if insufficient water is present in the beans, a complete removal or conversion of the glucosides may be prevented. Accordingly, where the beans are dry and do not possess a sufficient amount of water, there is danger that some of this moisture may be lost during the heating, and the desirable action on the glucosides terminated before it has been continued to the desired extent. Accordingly, with dry beans, it is desirable and advantageous to wash the beans or soak them in water, before the heat treatment, in order to increase their moisture content to an extent which will insure the desired change in the glucosides during the heat treatment. This preliminary treatment can readily be carried out by a regulated washing or soaking of the beans as a preliminary step of the process, prior to coating the beans with oil and the subsequent heat treatment. The change or removal of the unpleasant raw taste and smell of the soya beans appears to be due in part at least to the conversion of the glucosides during the heat treatment.

The hot gases used for heating the oil coated beans are advantageously products of combustion of combustible gases or fuels with air, since the presence of carbon dioxide in the hot gases is unobjectionable. Other hot gases can be used, such as the hot gases in a heated drum roaster, etc.

Before the beans are heated by the hot gases they are coated with a thin film of a suitable oil and particularly a mineral oil, such as inert paraffin oil. Only a small amount of oil is required, for example, around 2 or 4 pounds of the oil per thousand pounds of the beans, since the purpose of the oil is to coat the outer surfaces of the beans and form a thin protective film of oil which protects the beans without interfering with the free escape of the objectionable volatile constituents from the beans, or with the breaking down through chemical change of bodies imparting undesirable flavor and odor to those which are unobjectionable in these respects. The oil can be readily distributed over the surfaces of the beans by adding the oil while the beans are being tumbled in a rotating cylinder or sphere.

The heating of the coated beans is brought about by passing the hot gases into contact with the beans, or by bringing the beans into contact with hot surfaces, while they are being stirred or agitated, as in a rotating drum or sphere, where fresh surfaces of the beans are being continuously brought into contact with the hot gases, or hot surfaces, and the escaping gases carry with them the objectionable volatilized constituents. By avoiding external heating of the apparatus containing the beans, overheating and burning or scorching of the beans is avoided. Where externally heated apparatus is employed, care should be taken to agitate the beans, as in a rotating drum, to avoid local overheating. The temperature of the hot gases should also be such, when they come into contact with the beans, that overheating and scorching and burning of the beans is prevented. The hot gases should be at such a temperature that the beans are heated to a temperature around 95 to 105° C. for a sufficient time, around 5 to 10 minutes, to accomplish volatilization and removal of the objectionable volatile constituents, which removal is promoted by the current of hot gas passing into contact with the beans, but without removal of moisture to an undesirable extent. In a closed apparatus, such as a rotating sphere, the hot gases can be continuously supplied at one point, so that they mix with the gases already present in the sphere, and a corresponding amount of the gas can be removed from the sphere at another point. In this way, the hot products of combustion, or other gases, although at a high temperature when they enter the sphere, are cooled by admixture with the gases contained in the sphere, so that objectionable local overheating of the beans is prevented.

Some of the moisture content of the beans may be removed during the heat treatment, although this is to a large extent prevented or reduced by the oil layer coating the beans. In order to insure the presence of a sufficient amount of moisture in the beans, where they do not naturally contain a sufficiently high moisture content, it is advantageous, as already pointed out, to wash or soak the beans in water, and thereby add a small percentage of water to the beans, in order to insure that the beans will contain enough water, under all circumstances, to insure a thorough and complete change of the objectionable glucosides present. A regulated heating of the beans is also desirable, both to insure that the desirable changes take place during the heat treatment, and to avoid prolonged heating, or heating at too high temperatures, which might seriously impair the biological values of the treated beans. If a longer or higher heating is used, such that an appreciable removal of moisture takes place, care should be taken to see that the moisture content of the beans is sufficiently large so that there remains a sufficient amount of water in the beans to bring about the desired conversion or change in the constituents which are acted upon or hydrolyzed thereby. At a temperature of about 100° C., and with the natural water content of the raw soya beans of around 10 to 15%, completion of the process is brought about in a period of around 5 to 10 minutes; while if a higher temperature is used a further increase in the water content, by preliminarily soaking the beans before the heat treatment, is desirable and advantageous.

In general, the heat treatment should not be continued for a longer period or at a substantially higher temperature than is necessary to bring about the desirable changes to remove the unpleasant raw taste and smell from the beans, and to give to the beans and to the soya meal or flour produced therefrom, the desirable properties. A properly regulated heat treatment results in a minimum impairment of the biological values of the soya beans. The heating should be continued to insure that the kernel of the beans is thoroughly heated to about 90 to 95° C. This temperature in the kernel for a short time appears to be sufficient to bring about the desirable changes when sufficient moisture is present in the beans.

The process can also be carried out in a continuous manner, by continuously supplying the fresh beans at one end of a long rotating cylinder and coating them with oil, and by causing them to pass down through the cylinder progressively, as it rotates, countercurrent to the hot gases introduced at the opposite end of the cylinder, and with regulation of the rate of feed of the beans, the rotation of the cylinder and the time of passage of the beans therethrough, and the temperature and amount of hot gases passing through the cylinder, so that the beans are heated to the desired temperature for a short period of time, without objectionable overheating of the beans. Other types of apparatus can be used, such as apparatus of the grain drier type, having rotating steam heated pipes, and with stirring and agitation and throwing of the beans by the rotating members so that they are brought into contact with the heated surfaces.

After the beans have been treated in the manner described, they are permitted to cool, as by blowing a current of cold air over them. The amount of oil used for coating the beans is so small that, for many purposes, it is unobjectionable, and may be left on the beans. When the beans are dried to a moisture content of around 5%, the shells are readily removed, and, where so removed, the oil will be removed with the shells.

The beans treated by the present process are sufficiently refined so that the whole beans can be used directly for producing an edible flour which is free or substantially so from objectionable odor and taste, as well as from products of objectionable overheating of the proteins and other constituents of the beans. The heating of the beans kills or renders inactive, to a greater or less extent, the hydrolyzing and oxidizing enzymes, such as lipases, oxidases and peroxidases, so that, even though the oil is left in the beans and in the flour made from it, this oil does not undergo objectionable hydrolysis and oxidation, but is protected both by the rendering inactive of the hydrolyzing and oxidizing enzymes, and by the presence of natural protective or anti-oxidant constituents of the beans.

The treated beans, treated by the present process, are well adapted for use in making refined edible oil products and soya flour, by extracting the crushed beans with a suitable organic solvent to remove the greater part of the oil and oil-soluble constituents, while leaving the proteins and carbohydrate and other constituents of the beans in a form which makes a valuable flour product.

I claim:

1. The process of improving soya beans which comprises adjusting the moisture content of the unmilled beans to about 10 to 15%, coating the beans with a thin layer of a protective oil to protect the beans against oxidation and heating the beans while subjecting them to agitation in a gaseous atmosphere to effect removal of or changes in objectionable volatile constituents from the beans without overheating and injury to the valuable food constituents of the beans.

2. The process of improving soya beans in a continuous manner which comprises adjusting the moisture content of the unmilled beans to about 10 to 15%, coating the beans with a thin layer of a protective oil and heating the coated beans continuously and with continual agitation in a gaseous atmosphere to effect heating of the beans to a temperature sufficient to remove objectionable volatile constituents from the beans or effect change of undesirable to desirable constituents without objectionable injury to the protein and other food constituents of the beans.

3. The process of improving soya beans which comprises adjusting the moisture content of the unmilled beans to about 10 to 15%, coating the beans with a thin layer of a mineral oil to protect the beans against oxidation and heating the beans while subjecting them to agitation in a gaseous atmosphere to effect removal of or changes in objectionable volatile constituents from the beans without overheating and injury to the valuable food constituents of the beans.

4. The process of improving soya beans in a continuous manner which comprises adjusting the moisture content of the unmilled beans to about 10 to 15%, coating the beans with a thin layer of mineral oil and heating the coated beans continuously and with continual agitation in a gaseous atmosphere to effect heating of the beans to a temperature sufficient to remove objectionable volatile constituents from the beans or effect change of undesirable to desirable constituents without objectionable injury to the protein and other food constituents of the beans.

5. The process according to claim 2 in which the continuous process is carried out in a countercurrent manner, with countercurrent flow of the beans, while they are being agitated to expose fresh surfaces thereof to the gases.

6. The process according to claim 1 in which the hot gases are supplied by the burning of fuel with air, and with passage of the resulting hot products of combustion, at a regulated temperature, into contact with the beans while they are being agitated to expose fresh surfaces of the beans to the hot gases.

FRITZ GÖSSEL.